(12) United States Patent
Wang et al.

(10) Patent No.: US 10,009,904 B2
(45) Date of Patent: Jun. 26, 2018

(54) INTERFERENCE MITIGATION IN ASYMMETRIC LTE DEPLOYMENT

(71) Applicant: QUALCOMM INCORPORATED, San Diego, CA (US)

(72) Inventors: Neng Wang, Beijing (CN); Jilei Hou, Beijing (CN); Jiming Guo, Beijing (CN); Minghai Feng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/404,437

(22) PCT Filed: May 24, 2013

(86) PCT No.: PCT/CN2013/076198
§ 371 (c)(1),
(2) Date: Nov. 26, 2014

(87) PCT Pub. No.: WO2013/178037
PCT Pub. Date: Dec. 5, 2013

(65) Prior Publication Data
US 2015/0189666 A1 Jul. 2, 2015

Related U.S. Application Data

(63) Continuation of application No. PCT/CN2012/076330, filed on May 31, 2012, which
(Continued)

(51) Int. Cl.
*H04W 4/00* (2009.01)
*H04W 72/08* (2009.01)
(Continued)

(52) U.S. Cl.
CPC ........ *H04W 72/082* (2013.01); *H04B 17/327* (2015.01); *H04W 52/50* (2013.01);
(Continued)

(58) Field of Classification Search
CPC ............... H04W 72/082; H04W 52/50; H04W 72/0406; H04W 72/1226; H04W 52/242;
(Continued)

(56) References Cited

U.S. PATENT DOCUMENTS

| 8,260,206 B2 | 9/2012 | Damnjanovic |
| 2008/0192660 A1* | 8/2008 | Li ...................... H04W 72/087 370/294 |

(Continued)

FOREIGN PATENT DOCUMENTS

| CN | 102202400 A | 9/2011 |
| CN | 102348216 A | 2/2012 |

(Continued)

OTHER PUBLICATIONS

Supplementary European Search Report—EP13797442—Search Authority—The Hague—Oct. 23, 2015.
(Continued)

*Primary Examiner* — Abdelnabi O Musa
(74) *Attorney, Agent, or Firm* — Nerrie M. Zohn

(57) ABSTRACT

Interference mitigation solutions are disclosed for interference experienced based on asymmetric uplink (UL)/downlink (DL) slot configuration. The aggressor/victim network entities are identified using either measurement or static/semi-static means, such that the victim network entities that may be impacted by interference from aggressor network entity transmissions are identified. Inter Cell Interference Coordination (ICIC) mechanisms are extended to negotiate and address scheduling that intelligently mitigates interference that occurs in the colliding slots.

34 Claims, 12 Drawing Sheets

Related U.S. Application Data is a continuation of application No. PCT/CN2012/076346, filed on May 31, 2012.

(51) Int. Cl.

| | | |
|---|---|---|
| *H04W 72/12* | (2009.01) | |
| *H04W 52/50* | (2009.01) | |
| *H04B 17/327* | (2015.01) | |
| *H04W 72/04* | (2009.01) | |
| *H04W 52/24* | (2009.01) | |
| *H04B 17/309* | (2015.01) | |

(52) U.S. Cl.
CPC ... *H04W 72/0406* (2013.01); *H04W 72/1226* (2013.01); *H04B 17/309* (2015.01); *H04W 52/242* (2013.01); *H04W 52/244* (2013.01)

(58) Field of Classification Search
CPC .. H04W 52/244; H04B 17/327; H04B 17/309
See application file for complete search history.

(56) References Cited

U.S. PATENT DOCUMENTS

| | | | |
|---|---|---|---|
| 2009/0249153 A1 | 10/2009 | Zhang | |
| 2011/0110251 A1 | 5/2011 | Krishnamurthy et al. | |
| 2011/0310830 A1* | 12/2011 | Wu | H04W 72/1289 370/329 |
| 2012/0071106 A1 | 3/2012 | Kadous et al. | |
| 2012/0082052 A1 | 4/2012 | Oteri et al. | |
| 2012/0082101 A1 | 4/2012 | Gaal et al. | |
| 2012/0113844 A1* | 5/2012 | Krishnamurthy | H04L 1/0026 370/252 |
| 2012/0236736 A1 | 9/2012 | Frank et al. | |
| 2012/0307749 A1 | 12/2012 | Banister et al. | |
| 2013/0051351 A1 | 2/2013 | Seo et al. | |
| 2013/0272170 A1* | 10/2013 | Chatterjee | H04W 28/02 370/280 |
| 2013/0343241 A1* | 12/2013 | Niu | H04B 15/00 370/280 |
| 2015/0023263 A1* | 1/2015 | Son | H04W 72/082 370/329 |
| 2015/0131553 A1* | 5/2015 | Centonza | H04L 5/0032 370/329 |

FOREIGN PATENT DOCUMENTS

| | | |
|---|---|---|
| CN | 102404808 A | 4/2012 |
| JP | 2011077964 A | 4/2011 |
| WO | WO-2011127435 A1 | 10/2011 |
| WO | WO-2011157236 A1 | 12/2011 |
| WO | WO-2012064593 A1 | 5/2012 |

OTHER PUBLICATIONS

International Search Report and Written Opinion—PCT/CN2012/076330—ISA/EPO—Mar. 7, 2013.
International Search Report and Written Opinion—PCT/CN2013/076198—ISA/EPO—Aug. 29, 2013.
3rd Generation Partnership Project; Technical Specification Group Radio Access Network; Evolved Universal Terrestrial Radio Access (E-UTRA); TDD Home eNode B (HeNB) Radio Frequency (RF) requirements analysis 3GPP TR 36.922 V10.0.0, Apr. 2011 (Apr. 2011), pp. 50-52, 7.2.1.
New Postcom, "Need and Feasibility of using Different Uplink-downlink Configurations for TDD HeNBs in Heterogeneous Networks," 3GPP TSG-RAN WG1#61bis, 3GPP, Jul. 2, 2010, R1-103688, 6 pages.
Nokia Corporation., "Discussion on Methods to Support Different Time Scales for TDD UL-DL Reconfiguration," 3GPP TSG-RAN WG1, Meeting #69, Prague, Czech Republic, May 21-25, 2012, R1-122435, 4 pp.
Qualcomm: "Methods to Support Different Time Scales for Reconfiguration [online]," 3GPP TSG-RAN WG1#69 R1-122807, URL:http://www.3gpp.org/ftp/tsg_ran/WG1_RL1/TSGR1_69/Docs/R1-122807.zip, May 25, 2012, 3 pages.

* cited by examiner

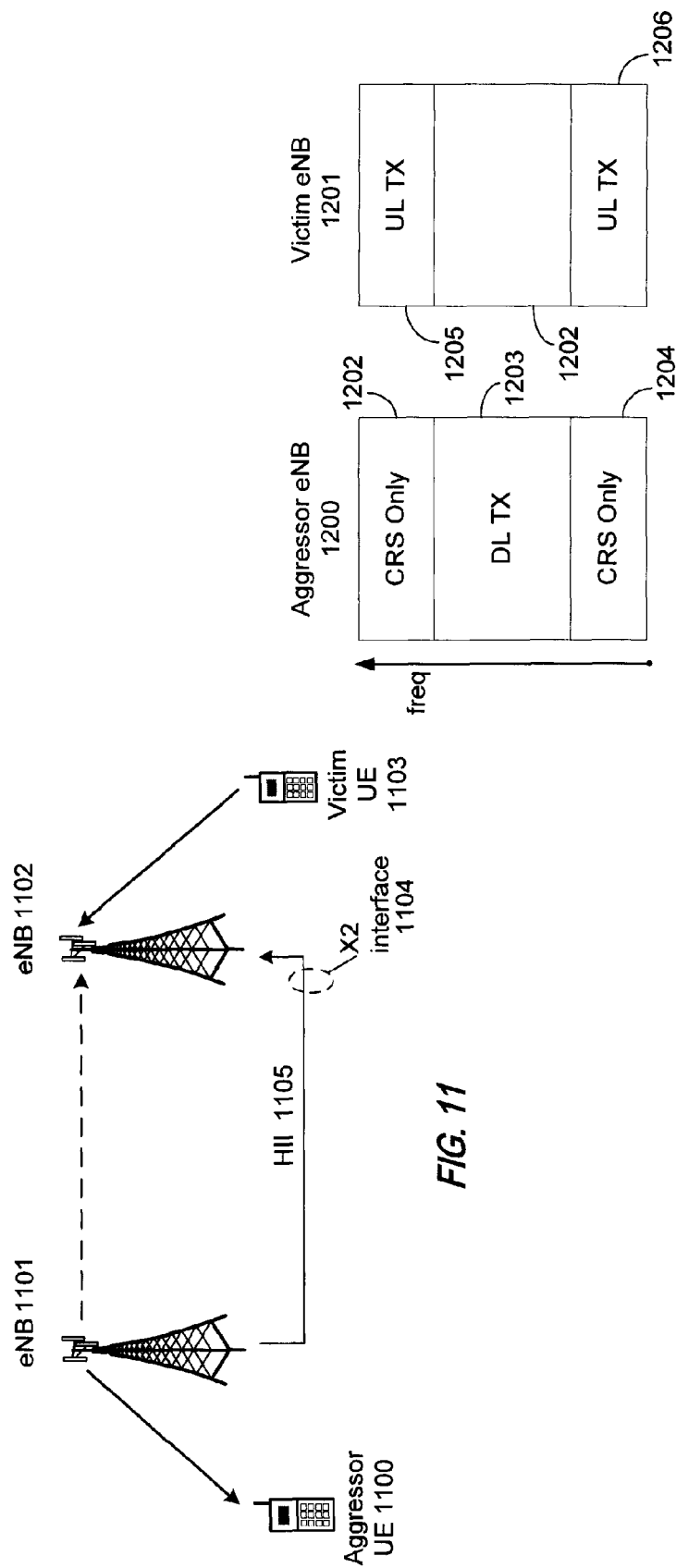

INTERFERENCE MITIGATION IN ASYMMETRIC LTE DEPLOYMENT

PRIORITY CLAIM TO RELATED APPLICATIONS

This application is a national phase application under 35 U.S.C. 371 of International Application No. PCT/CN2013/076198, filed May 24, 2013, which is a continuation of International Application No. PCT/CN2012/076346 and International Application No. PCT/CN2012/076330, both filed May 31, 2012. The entire contents of each of the above-referenced disclosures are specifically incorporated herein by reference without disclaimer.

BACKGROUND

Field

Aspects of the present disclosure relate generally to wireless communication systems, and more particularly, to interference mitigation in asymmetric long term evolution (LTE) deployment.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Representative aspects of the present disclosure are directed to interference mitigation solutions for interference based on asymmetric UL/DL slot configuration. When such interference is encountered, the aggressor/victim network entities are identified using either measurement or static/semi-static means, such that the victim network entities that may be impacted by interference from aggressor network entity transmissions are identified. Inter Cell Interference Coordination (ICIC) mechanisms are then extended to negotiate and address scheduling that intelligently mitigates interference that occurs in the colliding slots.

In one aspect of the disclosure, a method of wireless communication includes obtaining condition quality measurements by an aggressor evolved nodeB (eNB) associated with one or more network entities, identifying, by the eNB, one or more victim network entities subject to interference from asymmetric uplink (UL)/downlink (DL) slots based on the condition quality measurements, and transmitting a control signal to the one or more network entities, wherein the control signal relates to mitigation of the interference.

In an additional aspect of the disclosure, a method of wireless communication includes receiving a control signal at a victim eNB from an aggressor eNB, wherein the control signal indicates transmission conditions indicative of interference at the victim eNB, and scheduling, by the victim eNB, transmissions associated with the victim eNB to mitigate the interference.

In an additional aspect of the disclosure, an apparatus configured for wireless communication includes means for obtaining condition quality measurements by an aggressor eNB associated with one or more network entities, means for identifying, by the eNB, one or more victim network entities subject to interference from asymmetric UL/DL slots based on the condition quality measurements, and means for transmitting a control signal to the one or more network entities, wherein the control signal relates to mitigation of the interference.

In an additional aspect of the disclosure, an apparatus configured for wireless communication includes means for receiving a control signal at a victim eNB from an aggressor eNB, wherein the control signal indicates transmission conditions indicative of interference at the victim eNB, and means for scheduling, by the victim eNB, transmissions associated with the victim eNB to mitigate the interference.

In an additional aspect of the disclosure, a computer program product has a computer-readable medium having program code recorded thereon. This program code includes code for causing a computer to obtain condition quality measurements by an aggressor eNB associated with one or more network entities, code to identify, by the eNB, one or more victim network entities subject to interference from asymmetric UL/DL slots based on the condition quality measurements, and code to transmit a control signal to the one or more network entities, wherein the control signal relates to mitigation of the interference.

In an additional aspect of the disclosure, a computer program product has a computer-readable medium having program code recorded thereon. This program code includes code for causing a computer to receive a control signal at a victim eNB from an aggressor eNB, wherein the control signal indicates transmission conditions indicative of interference at the victim eNB, and code to schedule, by the victim eNB, transmissions associated with the victim eNB to mitigate the interference.

In an additional aspect of the disclosure, an apparatus includes at least one processor and a memory coupled to the processor. The processor is configured to obtain condition quality measurements by an aggressor eNB associated with one or more network entities, to identify, by the eNB, one or more victim network entities subject to interference from asymmetric UL/DL slots based on the condition quality measurements, and to transmit a control signal to the one or more network entities, wherein the control signal relates to mitigation of the interference.

In an additional aspect of the disclosure, an apparatus includes at least one processor and a memory coupled to the processor. The processor is configured to receive a control signal at a victim eNB from an aggressor eNB, wherein the control signal indicates transmission conditions indicative of interference at the victim eNB, and to schedule, by the victim eNB, transmissions associated with the victim eNB to mitigate the interference.

BRIEF DESCRIPTION OF THE DRAWINGS

FIG. 11 is a block diagram illustrating an aggressor and victim UE set configured according to one aspect of the present disclosure.

FIG. 12 is a block diagram illustrating a frequency division multiplex (FDM) partition configured according to one aspect of the present disclosure.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
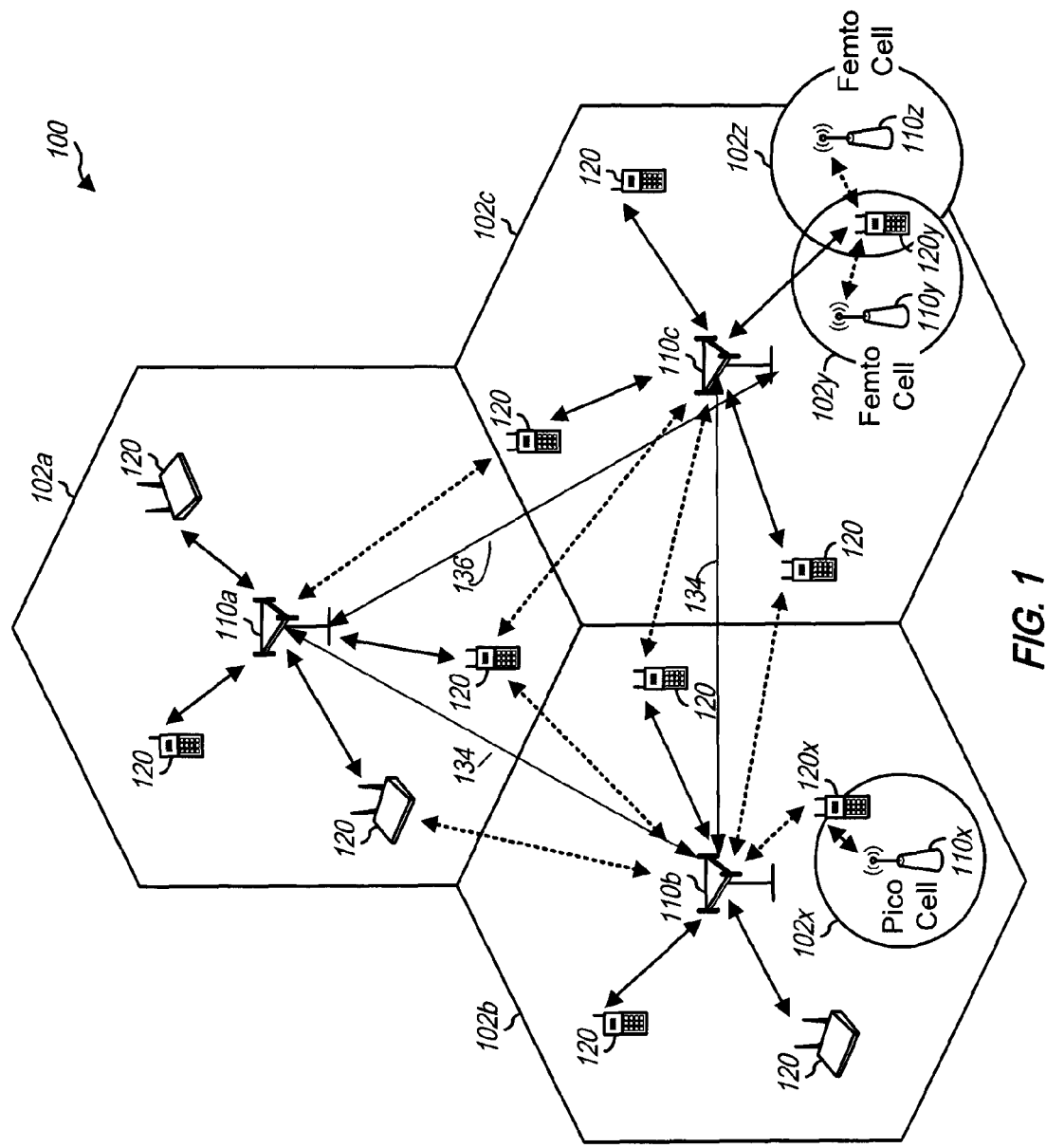
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
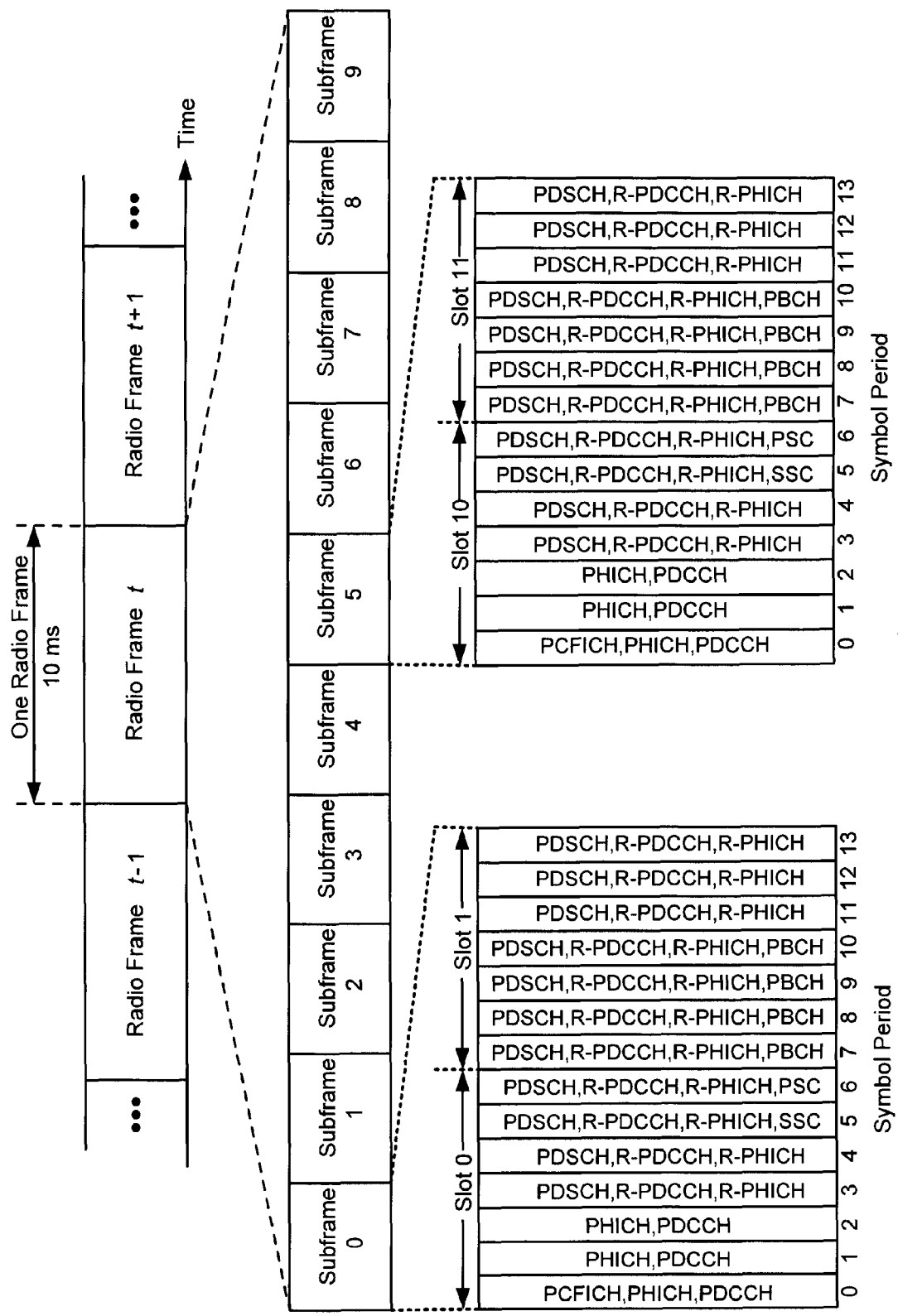
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
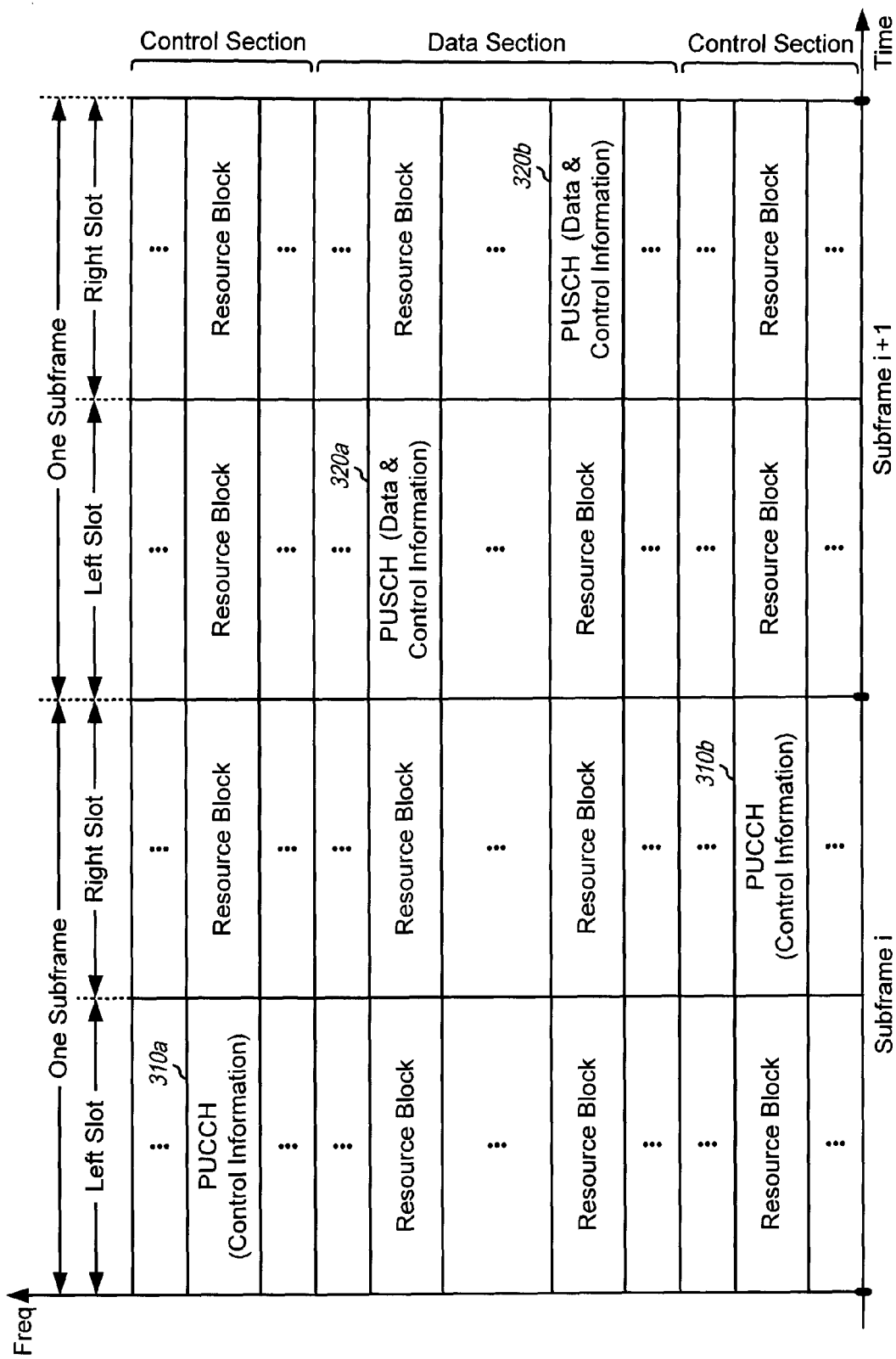
FIG. 3 is a block diagram conceptually illustrating an exemplary frame structure in uplink LTE/-A communications.

FIG. 3 is a block diagram illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310a and 310b in the control section. The UE may transmit only data or both data and control information in a Physical Uplink Shared Channel (PUSCH) on the assigned resource blocks 320a and 320b in the data section. An uplink transmission may span both slots of a subframe and may hop across frequency as shown in FIG. 3.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with cell range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 4:
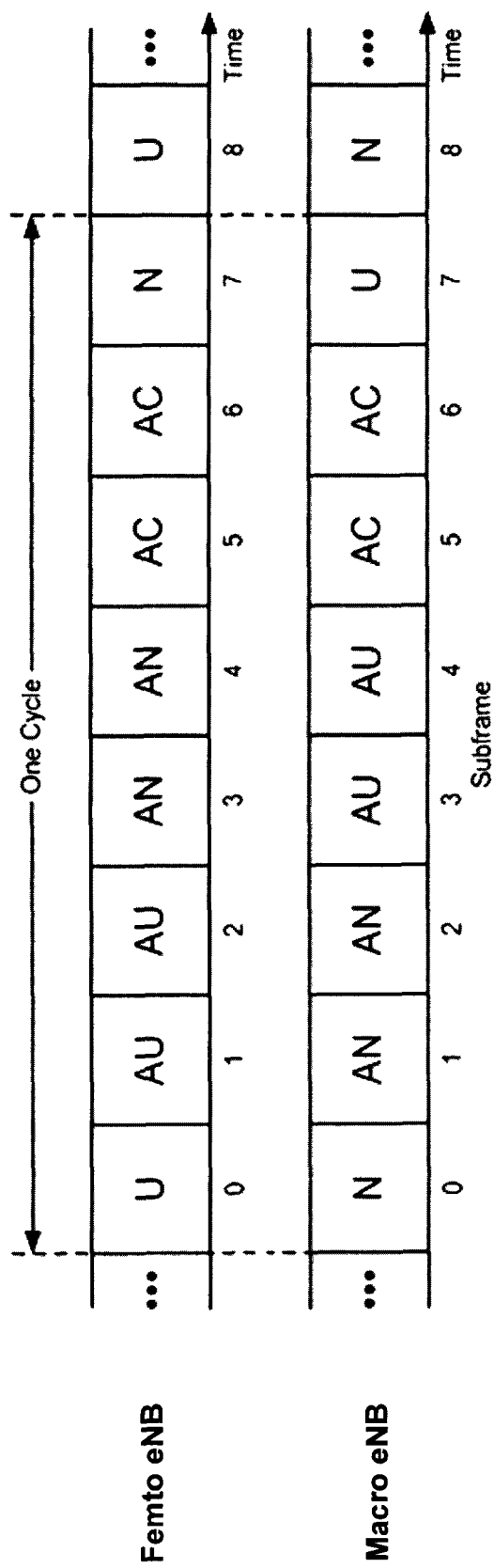
FIG. 4 is a block diagram conceptually illustrating time division multiplexed (TDM) partitioning in a heterogeneous network according to one aspect of the disclosure.

FIG. 4 is a block diagram illustrating time division multiplexed (TDM) partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for cell range expansion (CRE) UEs strongly affected by aggressor eNBs. A CRE UE may belong to a first eNB but also be located in the coverage area of a second eNB. For example, a UE communicating with a macro eNB that is near the range limit of a femto eNB coverage is a CRE UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities. This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c (as shown in FIG. 1) or to the femto eNB 110z also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 µs (5 km÷3×$10^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 5:
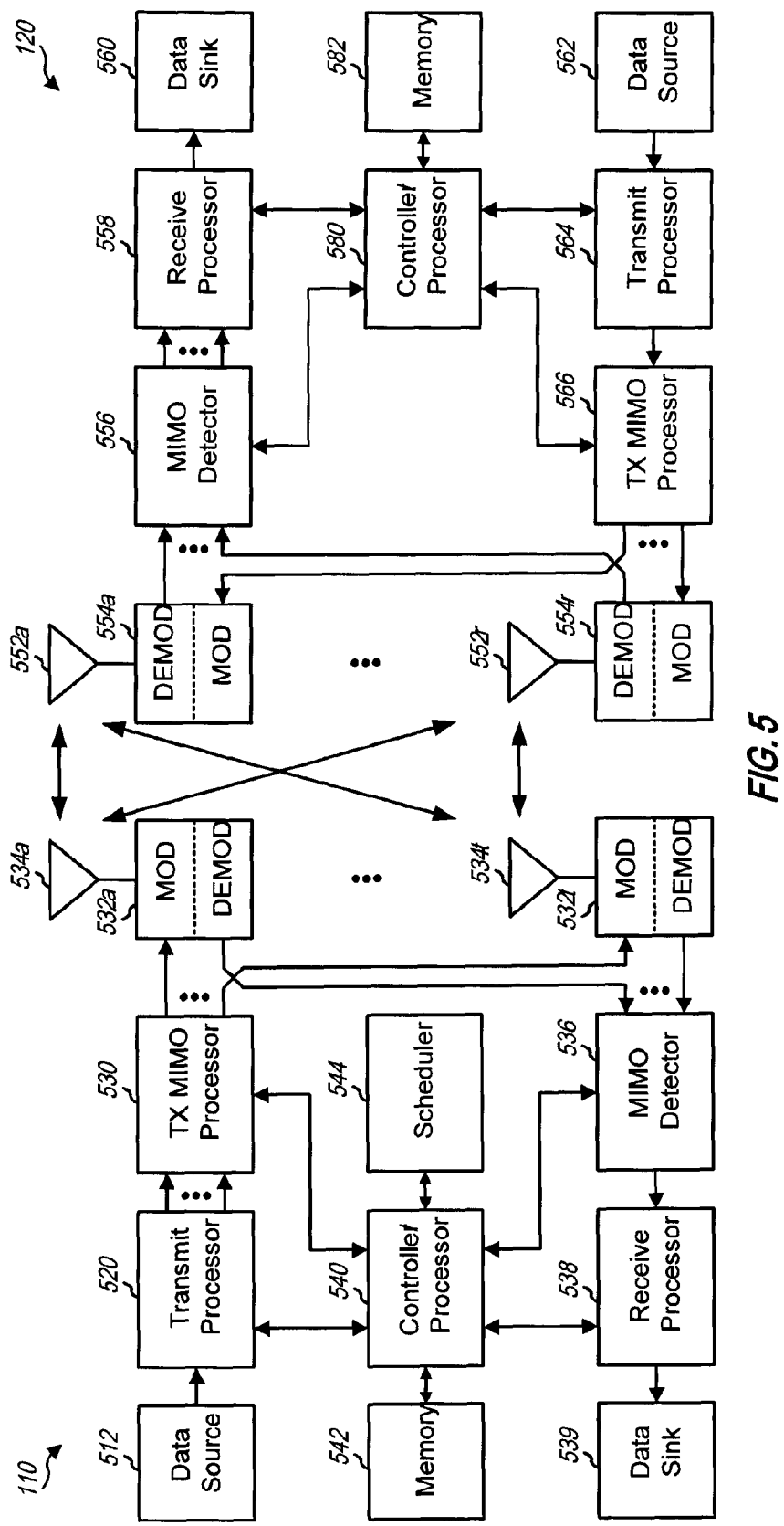
FIG. 5 is a block diagram conceptually illustrating a design of a base station/eNB and a UE configured according to one aspect of the present disclosure.

FIG. 5 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 534a through 534t, and the UE 120 may be equipped with antennas 552a through 552r.

At the eNB 110, a transmit processor 520 may receive data from a data source 512 and control information from a controller/processor 540. The control information may be for the PBCH, PCFICH, PHICH, PDCCH, etc. The data may be for the PDSCH, etc. The transmit processor 520 may process (e.g., encode and symbol map) the data and control information to obtain data symbols and control symbols, respectively. The transmit processor 520 may also generate reference symbols, e.g., for the PSS, SSS, and cell-specific reference signal. A transmit (TX) multiple-input multiple-output (MIMO) processor 530 may perform spatial processing (e.g., precoding) on the data symbols, the control symbols, and/or the reference symbols, if applicable, and may provide output symbol streams to the modulators (MODs) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via the antennas 534a through 534t, respectively.

At the UE 120, the antennas 552a through 552r may receive the downlink signals from the eNB 110 and may provide received signals to the demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554a through 554r, perform MIMO detection on the received symbols if applicable, and provide detected symbols. A receive processor 558 may process (e.g., demodulate, deinterleave, and decode) the detected symbols, provide decoded data for the UE 120 to a data sink 560, and provide decoded control information to a controller/processor 580.

On the uplink, at the UE 120, a transmit processor 564 may receive and process data (e.g., for the PUSCH) from a data source 562 and control information (e.g., for the PUCCH) from the controller/processor 580. The transmit processor 564 may also generate reference symbols for a reference signal. The symbols from the transmit processor 564 may be precoded by a TX MIMO processor 566 if applicable, further processed by the demodulators 554a through 554r (e.g., for SC-FDM, etc.), and transmitted to the eNB 110. At the eNB 110, the uplink signals from the UE 120 may be received by the antennas 534, processed by the modulators 532, detected by a MIMO detector 536 if applicable, and further processed by a receive processor 538 to obtain decoded data and control information sent by the UE 120. The processor 538 may provide the decoded data to a data sink 539 and the decoded control information to the controller/processor 540.

The controllers/processors 540 and 580 may direct the operation at the eNB 110 and the UE 120, respectively. The controller/processor 540 and/or other processors and modules at the eNB 110 may perform or direct the execution of various processes for the techniques described herein. The controllers/processor 580 and/or other processors and modules at the UE 120 may also perform or direct the execution of the functional blocks illustrated in FIGS. 8 and 9, and/or other processes for the techniques described herein. The memories 542 and 582 may store data and program codes for the eNB 110 and the UE 120, respectively. A scheduler 544 may schedule UEs for data transmission on the downlink and/or uplink.

Figure 6:
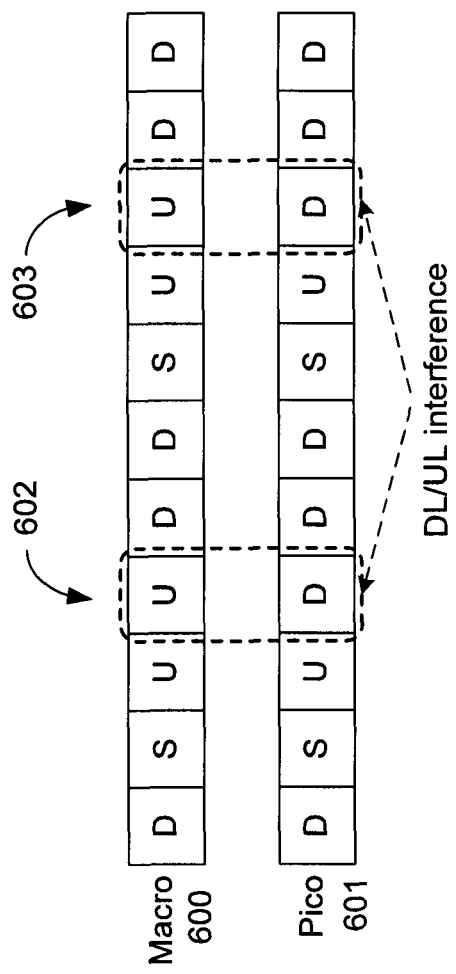
FIG. 6 is a block diagram illustrating time slots for two neighboring eNBs.

In time division duplex (TDD) systems, dynamic/semi-dynamic UL/DL timeslot configurations that are adaptable to real-time UL/DL traffic load are perceived as one way to improve spectrum utilization. FIG. 6 is a block diagram illustrating time slots for two neighboring eNBs. Macro eNB transmits information in macro transmission frame 600 using a first time slot configuration. The neighboring pico eNB transmits information in pico transmission frame 601 using a second different time slot configuration. The different time slot configurations create conflicting time slots, such macro transmission frame 600 operates an UL time slot while pico transmission frame 601 operates a DL time slot. However, different DL/UL timeslot configuration in neighboring cells, such as in time slots 602 and 603, may lead to various interference issues, including eNB-to-eNB interference, in which the DL operations of an eNB causes interference to the UE UL reception of neighboring cells. As the transmit power of an eNB may be significantly higher than the transmit power of a UE, the interference caused by the DL operations is not negligible. UE-to-UE interference may also result in the conflicting DL/UL timeslots. In UE-to-UE interference, the UE UL transmission may interfere with UE DL reception of UEs served by neighboring cells. This kind of interference may be very strong if the UEs are close to each other.

Figure 7:
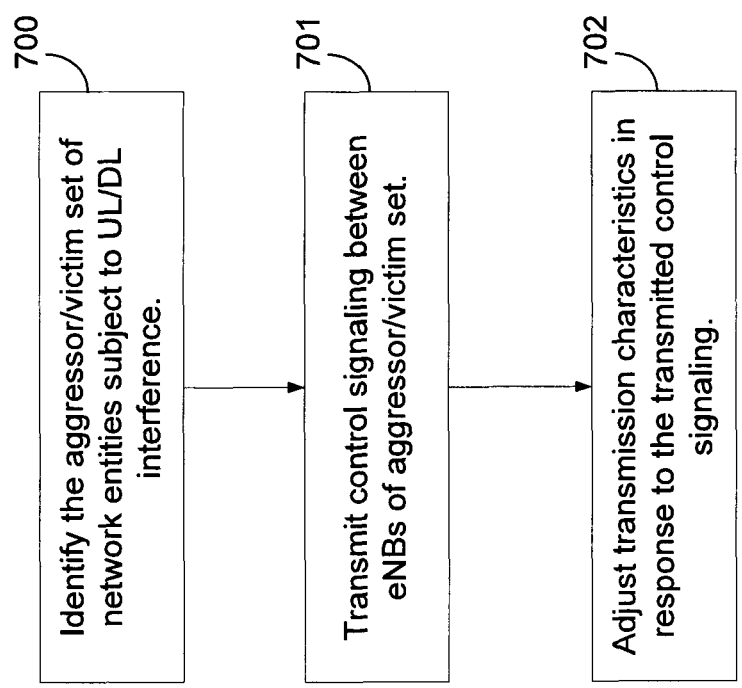
FIG. 7 is a functional block diagram illustrating example blocks executed to implement one aspect of the present disclosure.

Various aspects of the present disclosure propose interference mitigation solutions for both UE-to-UE and eNB-to-eNB interference handling. FIG. 7 is a functional block diagram illustrating example blocks executed to implement one aspect of the present disclosure. At block 700, an aggressor/victim set of network entities subject to UL/DL interference is identified. In selected aspects, the set of aggressor/victim eNBs is identified, while in other selected aspects, the set of aggressor/victim UEs is identified. For the purpose of mobility management, UEs measure the physical link of current serving and neighboring cells and report the reference signal receive power (RSRP)/reference signal received quality (RSRQ) to the network. UE measurement of pathloss and the signal strength of different cells can be used to classify the potential aggressor/victim network entity set in different cells. Interfering sets of eNB may also be identified in a static/semi-static configuration over the operation, administrative, and maintenance (OAM) interface.

At block 701, control signaling are transmitted between eNBs of aggressor/victim set. LTE ICIC includes various control signaling for inter-cell interference handling that may be transmitted between eNBs over the backhaul interface, such as the X2 interface. For example, the control signaling includes relative narrowband transmit power (RNTP), overload indicator (OI), and high interference indicator (HII). RNTP information is typically sent to neighbor eNBs. It contains one bit per physical resource block (PRB) in the downlink, indicating if the transmission power on that PRB will be greater than a given threshold. Thus, the neighbor eNBs that receive RNTP can anticipate which bands would suffer more severe interference and take the right scheduling decisions immediately rather than relying on the CQI reports from the UEs. While eNBs send out the RNTP messages proactively, the OI indicator is triggered when high-interference in the uplink direction is detected by an eNB. An eNB will send an OI to neighbor eNBs whose UEs are potentially the source of this high interference. The OI message also contains an interference level indication of low, medium or high per PRB. The HII, for UL transmissions, works similarly to the RNTP message for the DL. There is one bit per PRB indicating if neighboring eNBs should expect high interference power in the near future. Hence, typically PRBs assigned to cell-edge UEs are indicated. RSRP measurements as part of handover measurement reports can also be used to identify cell edge UEs. In a similar way this indicator can be used to identify the bands used in a frequency partitioning scheme.

Referring back to block 701, in aspects for addressing UE-to-UE interference, the eNB serving the aggressor UE may transmit an HII message to the eNB serving the victim UE over the X2 interference. In aspects for addressing eNB-to-eNB interference, the aggressor eNB may transmit RNTP to the victim eNB proactively identifying the RBs that are used and also their relative transmit power. The victim eNB may transmit OI messages to the aggressor eNB reactively, when high interference is experienced in some RBs.

At block 702, transmission characteristics are adjusted in response to the transmitted control signaling. For example, upon receiving the RNTP message from the aggressor eNB, the victim eNB may schedule UL traffic on unused or low interference RBs. Moreover, upon receiving OI messages from the victim eNB, the aggressor eNB may reduce DL power of the corresponding RBs. Through the communication of RNTP and OI messages, the aggressor and victim eNBs may negotiate transmit power.

Figure 8:
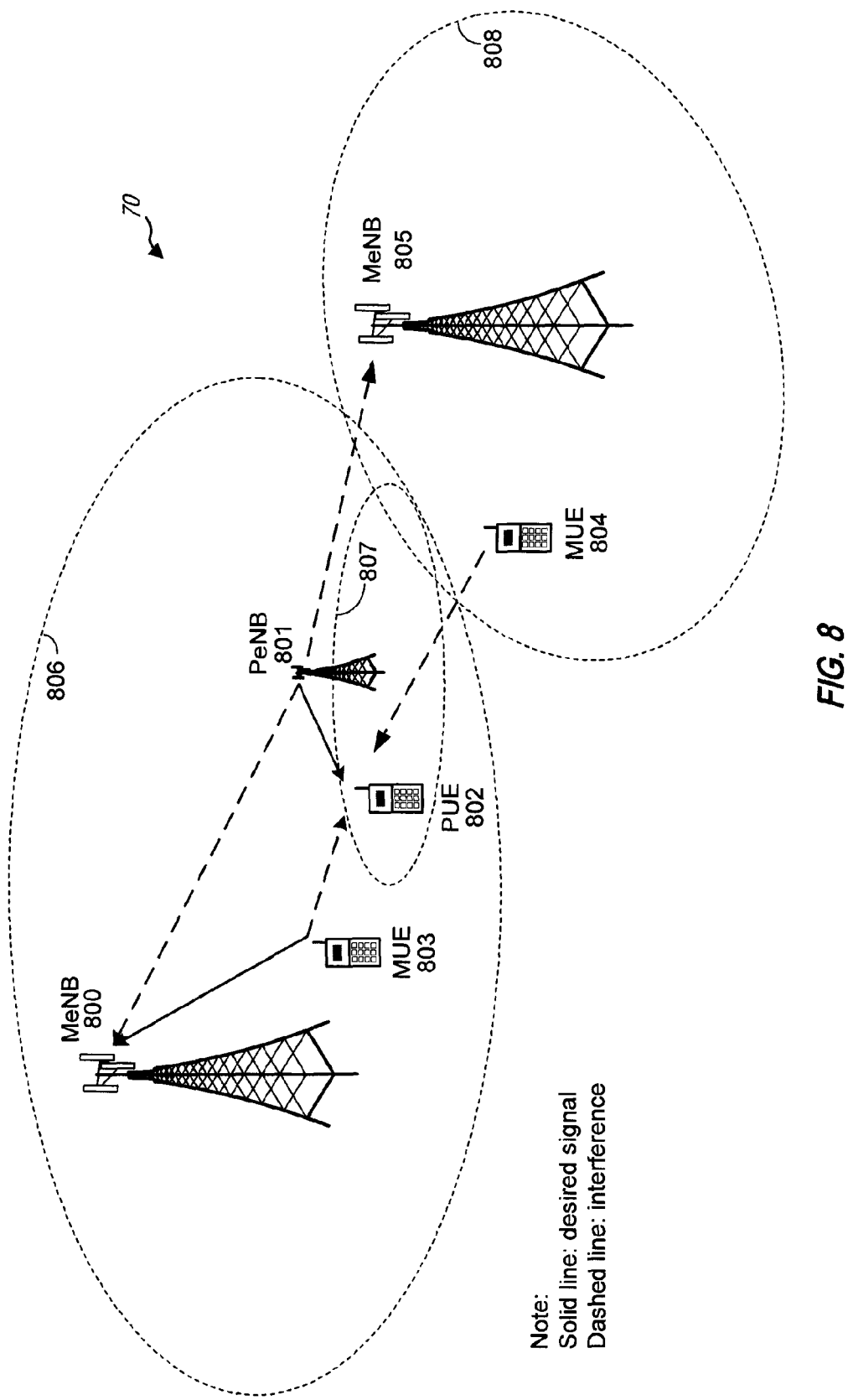
FIG. 8 is a block diagram illustrating a portion of a wireless communication network configured according to one aspect of the present disclosure.

FIG. 8 is a block diagram illustrating a portion of wireless communication network 70 configured according to one aspect of the present disclosure. The portion of wireless communication network 70 illustrated includes macro eNB (MeNB) 800 defining coverage area 806, pico eNB (PeNB) 801 defining pico coverage area 807, and MeNB 805, defining coverage area 808. Three UEs, MUE 803, PUE 802, and MUE 804, are located within one of coverage areas 806-808. The time slot configurations are different for MeNB 800, PeNB 801, and MeNB 805 causing an asymmetry in UL/DL time slots (e.g, subframes 602 or 603 from FIG. 6). Accordingly, during the same time slot, MUE 803 is scheduled for UL to MeNB 800, while PUE 802 is scheduled for DL from PeNB 801, and MUE 804 is scheduled for UL to MeNB 805. The UL communications scheduled from MUEs 803 and 804 create interference with respect to the DL communication from PeNB 801 to PUE 802. As MUE 803 is relatively close to PUE 802 than MUE 804, the DL interference from MUE 803 to PUE 802 is much stronger. Moreover, the DL communication from PeNB 801 may also cause interference with MeNBs 800 and 805 receiving their respective UL communications from MUE 803 and 804. Therefore, selected aspects of the present disclosure are directed to mitigating the UE-to-UE interference caused by the asymmetry in UL/DL time slots of PUE 802 and MUEs 803-804. Additional aspects of the present disclosure are directed to mitigating the eNB-to-eNB interference cause by the UL/DL asymmetry of PeNB 801 and MeNBs 800 and 805.

Figure 9B:
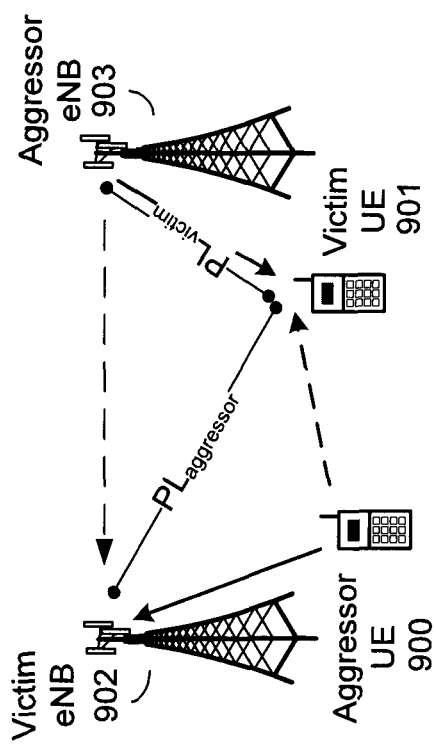
FIGS. 9A and 9B are block diagrams illustrating an aggressor/victim pair of UEs configured according to one aspect of the present disclosure.
Figure 9A:
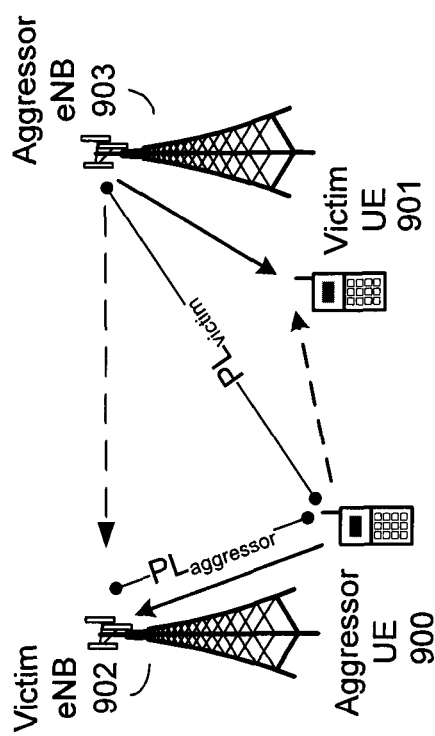

As previously described, UEs measure the physical link of the current and neighboring cells and report the RSRP/RSRQ to the network. FIGS. 9A and 9B are diagrams illustrating an aggressor/victim pair of UEs configured according to one aspect of the present disclosure. In FIGS. 9A and 9B, eNB 902 is the serving eNB for UE 900, and eNB 903 is the serving eNB for UE 901.

In a first example aspect of the present disclosure illustrated in FIGS. 9A and 9B, the asymmetry of UL/DL time slots create interference for victim UE 901. Specifically, the UL/DL asymmetry creates interference on the DL transmission from eNB 903 to victim UE 901 due to the UL transmission from aggressor UE 900 to eNB 902.

In the ordinary course of the mobility management measurements, aggressor UE 900 measures its pathloss to eNB 902, its serving eNB, and eNB 903, and transmits the condition quality measurements to its serving eNB, eNB 902, and neighboring eNBs, such as eNB 903. In FIG. 9B, victim UE 901 measures its pathloss to eNB 903, its serving eNB, and eNB 902, and transmits the condition quality measurements to its serving eNB, eNB 903. In some embodiments the UE may also transmit or serving eNB 903 may relay the condition quality measurements to neighboring eNBs, such as eNB 902. Based on network measurement setup for measuring the various condition quality measurements, aggressor/victim UEs are required to report their pathloss measurements to their serving cells, and possibly their neighboring cells. Using these condition quality measurement reports, the network can classify/identify potential aggressor/victim UE set whose pathlosses to aggressor and victim are similar. To make more accurate identification, the serving cells of aggressor/victim UEs can configure the measurement in a synchronous/semi-synchronous fashion.

The network receives the pathloss measurements and determines that victim UE 901 is the victim and aggressor UE 900 is the aggressor, when the pathloss from victim UE 901 to eNB 903 is close to or less than the pathloss from aggressor UE 900 to eNB 903 and the combined pathloss measurements indicate a proximity of aggressor UE 900 to victim UE 901. When these conditions are met, the network can identify the aggressor/victim UE set.

In a second example aspect of the present disclosure illustrated in FIGS. 9A and 9B, the asymmetry of UL/DL time slots create interference for victim eNB 902. Specifically, the UL/DL asymmetry creates interference on the UL from aggressor UE 900 at victim eNB 902 due to the DL transmission from aggressor eNB 903 to UE 901.

When a UE is configured to take various condition quality measurements, such as RSRP/RSRQ, pathloss, and the like, these condition quality measurement results can be utilized for aggressor/victim eNB set identification. The network determines that victim eNB 902 is the victim and aggressor eNB 903 is the aggressor, when the pathloss from UE 901 to aggressor eNB 903 is close to or less than the pathloss from UE 900 to victim eNB 903 and the combined pathloss measurements indicate a proximity of UE 900 to UE 901. The eNBs, such as eNB 902 and 903, may also be configured to perform similar condition quality measurements, such as pathloss. Using similar conditions, the network considers the related pathloss measurements between the aggressor and potential victim eNBs to determine the aggressor/victim set of eNBs. When these conditions are met, the network can identify the aggressor/victim eNB set. These measurement results can also be shared with cells with no UEs configured for such condition quality measurements to determine aggressor/victim eNB sets. eNBs with low pathloss may be categorized as aggressor/victim pair.

It should be noted that in additional aspects of the present disclosure, an additional method to identify a victim UE whose DL is heavily interfered with by potential aggressor UE UL communication is based on a dual CQI report. The dual CQI reporting capability currently exists in the LTE standards. With this configuration, a UE is configured to report two types of CQI corresponding to a time pattern which may experience UE-to-UE interference and a time pattern which experience little or no UE-to-UE interference. If the UE dual CQI reporting indicates a large difference between the CQIs, the UE may be experiencing interference from another UE and should, therefore, be scheduled in timeslots that have no interference due to asymmetrical DL/UL configuration.

Identification of an aggressor/victim eNB set allows the network to apply inter-eNB interference coordination and a coordinated scheduling mechanism during aggressor eNB transmission. It should further be noted that, in addition to the measurement-based solution described above with regard to asymmetric DL/UL configuration-based eNB-to-eNB interference, a static/semi-static configuration may be provided via the operation, administrative, and maintenance (OAM) interface, self-organizing network (SON), or other method to identify the aggressor/victim eNB set.

Figure 10:
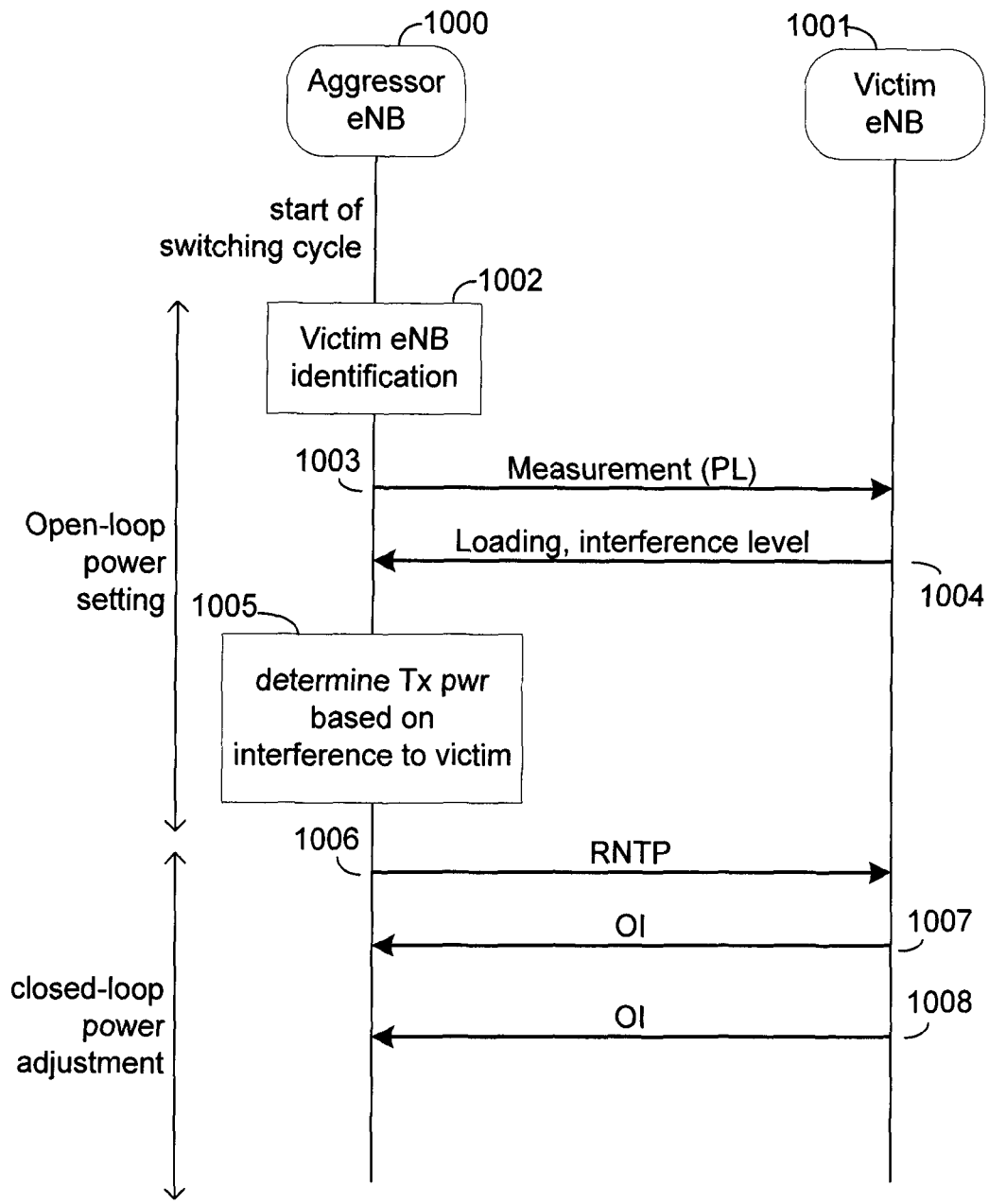
FIG. 10 is a timing diagram illustrating control signaling between an aggressor eNB and a victim eNB configured according to one aspect of the present disclosure.

FIG. 10 is a timing diagram illustrating control signaling between an aggressor eNB 1000 and a victim eNB 1001 configured according to one aspect of the present disclosure. As the switching cycle begins, at time 1002, an open loop power setting process begins in which aggressor eNB 1000 identifies any victim eNBs, such as victim eNB 1001. The aggressor eNB 1000 may then begin negotiation of initial transmission power with the identified victim eNBs. At time 1003, aggressor eNB 1000 measures its pathloss and transmits the results to victim eNB 1001 along with switching timeslot patterns and start times. In response to receiving the pathloss information, victim eNB 1001 transmits its loading and interference level to aggressor eNB 1000 at time 1004. At time 1005, aggressor eNB 1000 determines the transmit power based on the interference experienced at victim eNB 1001 and its measurement of pathloss to the victim eNB 1001. The initial transmit power is selected to minimize the impact to the UL reception of the victim eNB 1001.

A closed-loop power adjustment process with inter-cell interference coordination may then begin. Aggressor eNB 1000 may signal an RNTP message to victim eNB 1001 proactively, at time 1006, identifying the RBs that aggressor eNB 1000 intends to use and, if so, their relative transmit power. Victim eNB 1001 may then use the RNTP message to anticipate which bands will have more severe interference and intelligently make scheduling decisions around the more severe bands. For example, victim eNB 1001 may schedule UL traffic on unused RBs or RBs with low interference. As the victim eNB 1001 detects interference in RBs based on UE transmissions for UEs being served by neighboring eNBs, the victim eNB 1001 generates and transmits OI messages at times 1007 and 1008. The aggressor eNB 1000 may then use the information in the OI messages to direct the interfering UEs to reduce transmit power or reschedule UL transmissions on the corresponding RBs. According to this process, transmit power negotiation based on RNTP and OI may be exchanged on demand, and responses to these signals may be used to result in adjustment of the transmit power of aggressor eNB 1000. Interference may be mitigated using dynamic change of loading, user geometry, and the like.

FIG. 11 is a block diagram illustrating aggressor UE 1100 and victim 1103 set configured according to one aspect of the present disclosure. In FIG. 11, eNB 1101 is the serving eNB for UE 1100, and eNB 1102 is the serving eNB for UE 1103. Furthermore, eNB 1101 and eNB 1102 can communicate via X2 interface 1104.

In FIG. 11, the network identifies UL transmissions from aggressor UE 1100 to eNB 1101 causing high interference to victim UE 1103 DL reception from eNB 1102. Once such an aggressor/victim set is identified, the HII indication of the ICIC mechanism is extended for serving cell, eNB 1101, of aggressor UE 1100 to neighboring cells, eNB 1102, serving victim UEs, such as victim UE 1103. The eNB 1101 transmits HII notification 1105 to eNB 1102 over the backhaul X2 interface 1104. Upon receiving HII notification 1105 from eNB 1101, eNB 1102 may schedule other UEs during those interfering RBs or serve victim UE 1103 in a different frequency or RB to minimize the UE-to-UE interference impact.

In adjusting the transmission characteristics in response to the control signaling between cells in which asymmetric UL/DL-based UE-to-UE or eNB-to-eNB interference exists, specific scheduling may be employed to mitigate the effect of the interference. In UE-to-UE interference scenarios, the serving eNB of the aggressor may avoid scheduling of potential aggressors in colliding time slots in order to mitigate high UE-to-UE interference to victim UEs. Alternatively or additionally, serving eNBs of a victim UE may avoid scheduling of potential victim UEs in colliding time slots in order to mitigate high UE-to-UE interference from aggressor UEs.

In eNB-to-eNB interference scenarios, several different scheduling mechanisms may be used for mitigating the interference. FIG. 12 is a block diagram illustrating a frequency division multiplex (FDM) partition configured according to one aspect of the present disclosure. In colliding slots, the transmission information of aggressor eNB 1200 may be divided according to frequency in relation to the transmission information of victim eNB 1201. For example, aggressor eNB 1200 schedules common reference signals (CRS) only in frequencies at the slot edges 1202 and 1204. Data for DL transmission is scheduled at the center frequencies of the slot center 1203. The corresponding slot for victim eNB 1201 has been scheduled to transmit UL data at frequencies of slot edges 1205 and 1206. The frequencies of slot center 1206 of the slot of victim eNB 1201 corresponding to slot center 1203 are scheduled without any transmission information. Accordingly, the scheduled colliding slots will not include transmitted data that collides in corresponding frequencies.

In time division multiplex (TDM) configurations, aggressor/victim eNB sets may schedule DL/UL transmissions in a TDM fashion. For example, in the context of UL transmissions from victim eNBs UL, collisions may occur due to PUCCH messages for providing ACK/NACK for DL at victim eNB. In order to overcome the possible interference in such ACK/NACK UL PUCCH transmissions, the HARQ timeline may be changed. However, such a solution would currently require changes to the transmission standards. Another potential solution may be to schedule the ACK/NACK transmissions according to the FDM approach, as illustrated and described with respect to FIG. 12 above.

In the context of DL transmissions from aggressor eNBs, when the aggressor eNBs are pico eNBs capable of performing condition quality measurements the aggressor pico eNB may dynamically decode UL grant information for the victim eNBs and use the decoded information to schedule transmissions to avoid collision interference. Alternatively, a semi-static solution may be employed using DL/UL TDM partitioning. In one example aspect, a macro eNB may periodically notify the pico eNB via the X2 interface whether the conflicting subframe is to be used for UL transmission based on its traffic/load conditions. In another example aspect, the aggressor pico eNB configures a conflicting DL subframe as almost blank subframe (ABS) based on signal from the macro eNB. ABS subframes do not typically send any traffic channels and are mostly control channel frames with very low power. Almost blank resources are the available resources of ABS subframes that may be used with little data traffic interference. In still further aspects, the victim eNB may schedule a blank to the conflicting UL subframe. The various aspects of the present disclosure are not limited to any specific scheduling for mitigating interference due to the asymmetric UL/DL conflicting slots.

Figure 13:
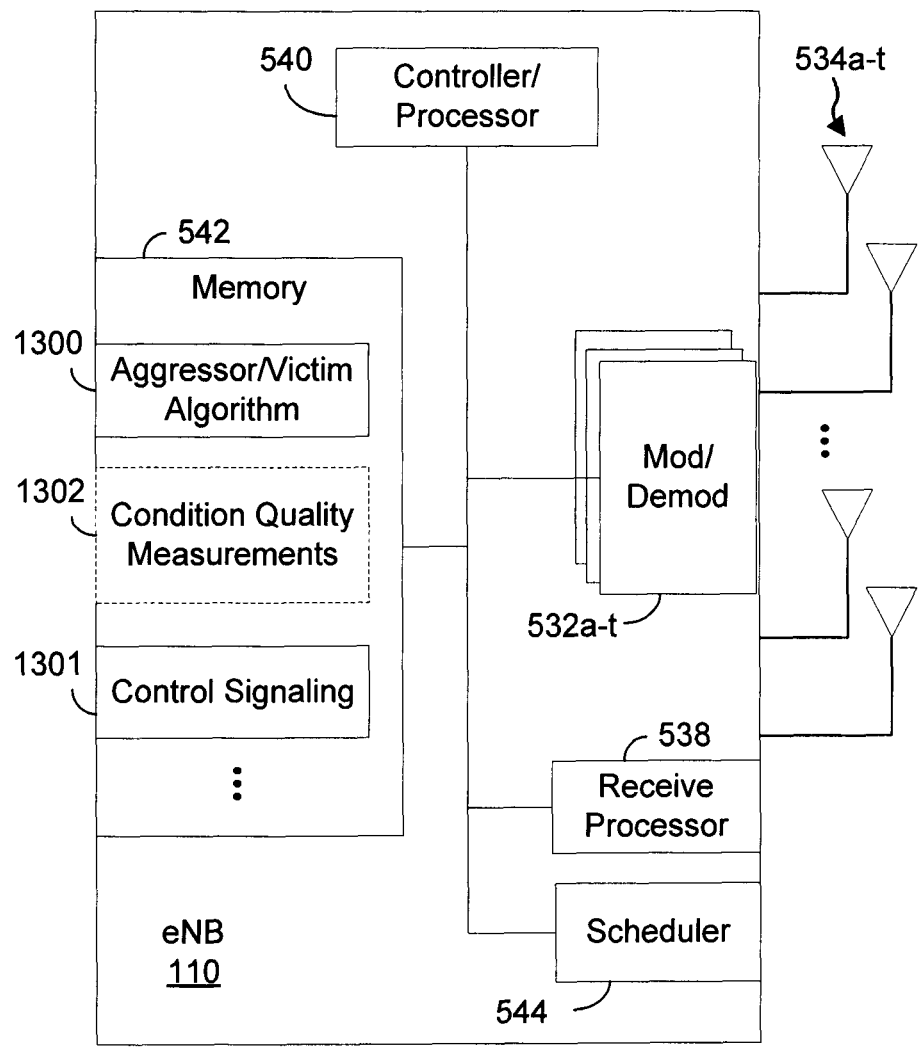
FIG. 13 is a block diagram illustrating an eNB configured according to one aspect of the present disclosure.

FIG. 13 is a block diagram illustrating an example eNB 110 configured according to one aspect of the present disclosure. The eNB 110 includes controller/processor 540 which executes firmware and software stored in memory 542 to operate the features and functionality of eNB 110. Controller/processor 540 also controls various components to of eNB 110 that implement these features. When eNB 110 is an aggressor eNB, signals received through antennas 534*a-t*, demodulated at modulator/demodulators 532*a-t*, processed at receive processor 538 are analyzed by controller/processor 540 executing aggressor/victim algorithm 1300 stored in memory 542. The aggressor/victim algorithm 1300 analyzes the signal measurements to determine one or more victim eNBs experiencing interference from asymmetric UL/DL slot configurations. The combination of these components and acts provides means for identifying at least one victim eNB subject to interference from asymmetric UL/DL slots with the aggressor eNB.

Once the victim eNB has been identified, current reception quality information may be received via antennas 534*a-t*, modulator/demodulators 532*a-t*, receive processor 538 and used by controller/processor 540 to set the transmission power. The combination of these components and acts provides means for setting an initial transmission power based on current reception quality information received from the at least one victim eNB.

Controller/processor 540 generates control signals, such as an RNTP, by accessing control signaling application 1301 in memory 542. The generated signals are then modulated at modulator/demodulators 532*a-t* and transmitted over antennas 534*a-t*. The combination of these components and acts provides means for transmitting first control signaling from the aggressor eNB to the at least one victim eNB identifying one or more transmit RBs and the initial transmission power.

When operating as a victim eNB, eNB 110 may receive control signaling from an aggressor eNB through antennas 534*a-t*, modulator/demodulators 532*a-t*, and receive processor 538. The controller/processor 540 reads the identified RBs and an initial transmission power that the aggressor eNB included in the control signaling. The combination of these components and acts provides means for receiving first control signaling from an aggressor eNB identifying one or more transmit RBs and a initial transmission power of the aggressor eNB.

Controller/processor 540 uses the control signaling and identified transmit power for the identified transmit RBs to schedule, using scheduler 544, uplink transmissions in RBs that either experience lower interference or that avoid the corresponding transmit RBs identified in the control signaling. The combination of these components and acts provides means for scheduling one or more UEs being served by the victim eNB for uplink transmission to mitigate interference with the one or more transmit RBs.

In additional aspects of the present disclosure, when configured as serving an aggressor UE, eNB 110 receives condition quality measurements 1302 over antennas 534*a-t*, which are demodulated by modulator/demodulators 532*a-t*, and processed at receive processor 538 and stored in memory 542. The combination of these components and acts provides means for receiving condition quality measurements at an eNB from an aggressor UE served by the eNB and from one or more victim UEs served by one or more neighboring eNBs.

In this additional aspect, controller/processor 540 then executes aggressor/victim algorithm 1300 stored in memory 542 to compare and analyze the condition quality measurements. The results of the aggressor/victim algorithm 1300 identifies the victim UEs served in neighboring cells. The combination of these components and acts provides means for identifying the one or more victim UEs based on the condition quality measurements.

As the victim UEs are identified, eNB 110, under control of controller/processor 540, accesses the control signal application 1301 stored in memory 542 to generate a control signal, such as an HII, for the neighboring cells. Controller/processor 540 transmits the control signal to the neighboring cells first modulating the signal at modulator/demodulators 532*a-t* and then transmitting over antennas 534*a-t*. The combination of these components and acts provides means for transmitting a control signal to the one or more neighboring eNBs indicating expected high interference associated with one or more uplink RBs assigned to the aggressor UE.

When eNB 110 operates as a neighboring eNB that serves one of the victim UEs, control signals are received at antennas 534*a-t*, demodulated at modulator/demodulators 532*a-t*, and processed at receive processor 538. The combination of these components and acts provides means for receiving a control signal at an eNB from a serving eNB serving an aggressor UE, wherein the control signal indicates high interference expected by the serving eNB associated with one or more uplink RBs assigned to the aggressor UE.

Controller/processor 540 uses the received control signal with scheduler 544, under control of controller/processor 540, to schedule the UEs that eNB 110 is serving to mitigate the downlink interference that may be caused by uplink transmissions of the aggressor UE. The scheduling signals from scheduler 544 are transmitted, under control of controller/processor 540, to the target UEs first modulating the signals at modulator/demodulators 532*a-t* and transmitting over antennas 534*a-t*. The combination of these components and acts provides means for scheduling one or more UEs served at the eNB to mitigate interference at the one or more UEs caused by uplink transmission from the aggressor UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    obtaining condition quality measurements by an aggressor evolved nodeB (eNB) associated with one or more network entities;
    identifying, by the aggressor eNB, one or more victim network entities subject to interference from asymmetric uplink (UL)/downlink (DL) slots based on the condition quality measurements;
    transmitting, by the aggressor eNB, a control signal to the one or more victim network entities, wherein the control signal relates to mitigation of the interference;
    receiving, by the aggressor eNB, an overload indicator indicating a level of interference on at least one resource block attributed to at least one aggressor user equipment (UE) being served by the aggressor eNB, wherein the level of interference on the at least one resource block is one of: low, medium, and high; and initiating a resource block mitigation operation in response to the received overload indicator, wherein the resource block mitigation operation includes at least one of:

directing the at least one aggressor UE to reduce transmit power on the at least one resource block, and directing the at least one aggressor UE to reschedule transmissions scheduled on the at least one resource block.

2. The method of claim 1, wherein the at least one aggressor UE is one of the one or more network entities.

3. The method of claim 2, further comprising:

comparing the condition quality measurements, wherein the condition quality measurements are associated with the at least one aggressor UE and remaining ones of the one or more network entities; and wherein the identifying is based, at least in part, on the comparing.

4. The method of claim 3, wherein the conditional quality measurements comprise one or more of:

a reference signal receive power (RSRP);
a reference signal receive quality (RSRQ);
pathloss measurements to the serving eNB and the one or more neighboring eNBs;
a channel quality indicator (CQI); or
a combination thereof.

5. The method of claim 1, further comprising:

adjusting, by the aggressor eNB, an initial transmission power in response to the received overload indicator.

6. The method of claim 1, wherein the obtaining comprises receiving the condition quality measurements from the one or more network entities, and wherein the identifying comprises analyzing the condition quality measurements to determine the one or more victim network entities.

7. The method of claim 1, wherein the obtaining comprises measuring the condition quality measurements associated with the one or more network entities, and wherein the identifying comprises analyzing the condition quality measurements to determine the one or more victim network entities.

8. The method of claim 1, further comprising:

partitioning a downlink slot at the aggressor eNB according to frequency; and assigning a first frequency for downlink data in the downlink slot, wherein the first frequency corresponds to an almost blank resource in a corresponding uplink slot of the one or more victim network entities.

9. The method of claim 1, further comprising:

decoding, at the aggressor eNB, uplink grant information of the one or more victim network entities; and scheduling downlink transmission at the aggressor eNB to avoid collision with uplink transmission indicated in the decoded uplink grant information.

10. The method of claim 1, further comprising:

receiving, at the aggressor eNB, uplink transmission information over a backhaul interface from the one or more victim network entities; and scheduling downlink transmission at the aggressor eNB to avoid collision with uplink transmission indicated in the uplink transmission information.

11. The method of claim 10, wherein the scheduling comprises:

scheduling a downlink subframe conflicting with an uplink subframe of the one or more victim network entities as an almost blank subframe (ABS).

12. A method of wireless communication, comprising:

receiving a control signal at a victim evolved nodeB (eNB) from an aggressor eNB, wherein the control signal indicates transmission conditions indicative of interference at the victim eNB;

scheduling, by the victim eNB, transmissions associated with the victim eNB to mitigate the interference;

detecting a level of interference in one or more resource blocks (RBs) assigned to one or more victim UEs being served by the victim eNB, wherein the level of interferences in the one or more RBs is one of: low, medium, and high; and transmitting an overload indicator to the aggressor eNB, in response to the detecting, indicating the level of detected interference in the one or more RBs, wherein a resource block mitigation operation is initiated in response to the overload indicator, and wherein the resource block mitigation operation includes at least one of:

directing at least one aggressor UE being served by the aggressor eNB to reduce transmit power on the one or more RBs, and directing the at least one aggressor UE to reschedule transmissions scheduled on the one or more RBs.

13. The method of claim 12, wherein the control signal indicates high interference expected from the aggressor eNB with the one or more RBs assigned to the one or more victim UEs.

14. The method of claim 13, wherein the scheduling comprises:

scheduling, by the victim eNB, a non-victim UE of the plurality of UEs in a subframe in which the non-victim UE does not experience interference caused by the transmission conditions in the subframe.

15. The method of claim 12, wherein the scheduling comprises:

partitioning, by the victim eNB, a transmission slot associated with the victim eNB according to frequency; and assigning a first frequency for downlink data in the transmission slot, wherein the first frequency corresponds to an almost blank resource in a corresponding reverse transmission slot associated with the aggressor eNB.

16. The method of claim 12, wherein the scheduling comprises:

modifying a hybrid automatic retransmission request (HARQ) timeline to avoid uplink acknowledgement (ACK)/negative acknowledgement (NACK) scheduled for an uplink slot of the victim eNB corresponding to a downlink slot of the aggressor eNB.

17. The method of claim 12, wherein the scheduling comprises:

scheduling a blank slot in an uplink subframe of the victim eNB corresponding to a downlink subframe in the aggressor eNB.

18. A non-transitory computer-readable medium having program code recorded thereon, the program code including:

program code for causing a computer to obtain condition quality measurements by an aggressor evolved nodeB (eNB) associated with one or more network entities;

program code for causing the computer to identify, by the aggressor eNB, one or more victim network entities subject to interference from asymmetric uplink (UL)/ downlink (DL) slots based on the condition quality measurements;

program code for causing the computer to transmit, by the aggressor eNB, a control signal to the one or more victim network entities, wherein the control signal relates to mitigation of the interference;

program code for causing the computer to receive, by the aggressor eNB, an overload indicator indicating a level of interference on at least one resource block attributed to at least one aggressor user equipment (UE) being served by the aggressor eNB, wherein the level of interference on the at least one resource block is one of: low, medium, and high; and program code for causing the computer to initiate a resource block mitigation operation in response to the received overload indicator, wherein the resource block mitigation operation includes at least one of:
  directing the at least one aggressor UE to reduce transmit power on the at least one resource block, and
  directing the at least one aggressor UE to reschedule transmissions scheduled on the at least one resource block.

19. The non-transitory computer-readable medium of claim 18, wherein the at least one aggressor UE is one of the one or more network entities.

20. The non-transitory computer-readable medium of claim 19, further comprising:
  program code for causing the computer to compare the condition quality measurements, wherein the condition quality measurements are associated with the at least one aggressor UE and remaining ones of the one or more netowrk entities; and
  wherein the program code for causing the computer to identify is executed based, at least in part, on results of execution of the program code for causing the computer to compare.

21. The non-transitory computer-readable medium of claim 20, wherein the conditional quality measurements comprise one or more of:
  a reference signal receive power (RSRP);
  a reference signal receive quality (RSRQ);
  pathloss measurements to the serving eNB and the one or more neighboring eNBs;
  a channel quality indicator (CQI); or
  a combination thereof.

22. The non-transitory computer-readable medium of claim 18, further comprising:
  program code for causing the computer to partition a downlink slot at the aggressor eNB according to frequency; and
  program code for causing the computer to assign a first frequency for downlink data in the downlink slot, wherein the first frequency corresponds to an almost blank resource in a corresponding uplink slot of the one or more victim network entities.

23. The non-transitory computer-readable medium of claim 18, further comprising:
  program code for causing the computer to decode, at the aggressor eNB, uplink grant information of the one or more victim network entities; and
  program code for causing the computer to schedule downlink transmission at the aggressor eNB to avoid collision with uplink transmission indicated in the decoded uplink grant information.

24. The non-transitory computer-readable medium of claim 18, further comprising:
  program code for causing the computer to adjust, by the aggressor eNB, an initial transmission power in response to the received overload indicator.

25. A non-transitory computer-readable medium having program code recorded thereon, the program code including:
  program code for causing a computer to receive a control signal at a victim evolved nodeB (eNB) from an aggressor eNB, wherein the control signal indicates transmission conditions indicative of interference at the victim eNB; and
  program code for causing the computer to schedule, by the victim eNB, transmissions associated with the victim eNB to mitigate the interference;
  program code for causing the computer to detect a level of interference in one or more resource blocks (RBs) assigned to one or more victim UEs being served by the victim eNB, wherein the level of interferences in the one or more RBs is one of: low, medium, and high; and
  program code for causing the computer to transmit an overload indicator to the aggressor eNB, in response to the detecting, indicating the level of detected interference in the one or more RBs, wherein a resource block mitigation operation is initiated in response to the overload indicator, and wherein the resource block mitigation operation includes at least one of:
  directing at least one aggressor UE being served by the aggressor eNB to reduce transmit power on the one or more RBs, and
  directing the at least one aggressor UE to reschedule transmissions scheduled on the one or more RBs.

26. The non-transitory computer-readable medium of claim 25, wherein the program code for causing the computer to schedule comprises:
  program code for causing the computer to partition, by the victim eNB, a transmission slot associated with the victim eNB according to frequency; and
  program code for causing the computer to assign a first frequency for downlink data in the transmission slot, wherein the first frequency corresponds to an almost blank resource in a corresponding reverse transmission slot associated with the aggressor eNB.

27. An apparatus configured for wireless communication, the apparatus comprising:
  at least one processor; and
  a memory coupled to the at least one processor,
  wherein the at least one processor is configured:
    to obtain condition quality measurements by an aggressor evolved nodeB (eNB) associated with one or more network entities;
    to identify, by the aggressor eNB, one or more victim network entities subject to interference from asymmetric uplink (UL)/downlink (DL) slots based on the condition quality measurements;
    to transmit, by the aggressor eNB, a control signal to the one or more victim network entities, wherein the control signal relates to mitigation of the interference;
    to receive, by the aggressor eNB, an overload indicator indicating a level of interference on at least one resource block attributed to at least one aggressor user equipment (UE) being served by the aggressor eNB, wherein the level of interference on the at least one resource block is one of: low, medium, and high; and to initiate a resource block mitigation operation in response to the received overload indicator, wherein the resource block mitigation operation includes at least one of:
  directing the at least one aggressor UE to reduce transmit power on the at least one resource block, and
  directing the at least one aggressor UE to reschedule transmissions scheduled on the at least one resource block.

28. The apparatus of claim 27, wherein the at least one aggressor UE is one of the one or more network entities.

29. The apparatus of claim 28, further comprising configuration of the at least one processor:
  to compare the condition quality measurements, wherein the condition quality measurements are associated with the at least one aggressor UE and remaining ones of the one or more network entities; and
  to identify is executed based, at least in part, on results of execution of configuration to compare.

30. The apparatus of claim 29, wherein the conditional quality measurements comprise one or more of:
  a reference signal receive power (RSRP);
  a reference signal receive quality (RSRQ);
  pathloss measurements to the serving eNB and the one or more neighboring eNBs;
  a channel quality indicator (CQI); or
  a combination thereof.

31. The apparatus of claim 27, further comprising configuration of the at least one processor:
  to partition a downlink slot at the aggressor eNB according to frequency; and
  to assign a first frequency for downlink data in the downlink slot, wherein the first frequency corresponds to an almost blank resource in a corresponding uplink slot of the one or more victim network entities.

32. The apparatus of claim 27, further comprising configuration of the at least one processor to adjust, by the aggressor eNB, an initial transmission power in response to the received overload indicator.

33. An apparatus configured for wireless communication, the apparatus comprising:
  at least one processor; and
  a memory coupled to the at least one processor,
  wherein the at least one processor is configured:
    to receive a control signal at a victim evolved nodeB (eNB) from an aggressor eNB, wherein the control signal indicates transmission conditions indicative of interference at the victim eNB; and
    to schedule, by the victim eNB, transmissions associated with the victim eNB to mitigate the interference;
    to detect a level of interference in one or more resource blocks (RBs) assigned to one or more victim UEs being served by the victim eNB, wherein the level of interferences in the one or more RBs is one of: low, medium, and high; and
    to transmit an overload indicator to the aggressor eNB, in response to the detecting, indicating the level of detected interference in the one or more RBs, wherein a resource block mitigation operation is initiated in response to the overload indicator, and wherein the resource block mitigation operation includes at least one of:
      directing at least one aggressor UE being served by the aggressor eNB to reduce transmit power on the one or more RBs, and
      directing the at least one aggressor UE to reschedule transmissions scheduled on the one or more RBs.

34. The apparatus of claim 33, wherein the configuration of the at least one processor to schedule comprises configuration of the at least one processor:
  to partition, by the victim eNB, a transmission slot associated with the victim eNB according to frequency; and
  to assign a first frequency for downlink data in the transmission slot, wherein the first frequency corresponds to an almost blank resource in a corresponding reverse transmission slot associated with the aggressor eNB.

* * * * *